US009568041B2

(12) United States Patent
Boveroux et al.

(10) Patent No.: US 9,568,041 B2
(45) Date of Patent: Feb. 14, 2017

(54) ONE-PIECE CONNECTING ROD AND PRODUCTION METHOD THEREOF

(71) Applicant: BD INVENT SA, Heure-le-Romain (BE)

(72) Inventors: Benoît Boveroux, Rocourt (BE); Daniel Dardenne, Heure-le-Romain (BE)

(73) Assignee: BD Invent SA, Heure-le-Romain (BE)

( * ) Notice: Subject to any disclaimer, the term of this patent is extended or adjusted under 35 U.S.C. 154(b) by 0 days.

(21) Appl. No.: 14/434,491

(22) PCT Filed: Oct. 10, 2013

(86) PCT No.: PCT/EP2013/071205
§ 371 (c)(1),
(2) Date: Apr. 9, 2015

(87) PCT Pub. No.: WO2014/057058
PCT Pub. Date: Apr. 17, 2014

(65) Prior Publication Data
US 2015/0267739 A1   Sep. 24, 2015

(30) Foreign Application Priority Data
Oct. 11, 2012   (BE) .................................. 2012/0688

(51) Int. Cl.
*F16C 7/02*   (2006.01)
*B29C 70/30*   (2006.01)
(Continued)

(52) U.S. Cl.
CPC .............. *F16C 7/026* (2013.01); *B29C 70/30* (2013.01); *B29C 70/86* (2013.01); *B29K 2063/00* (2013.01);
(Continued)

(58) Field of Classification Search
CPC .... B23P 2700/04; B29C 53/60; B29C 53/665; B29C 70/30; B29C 70/86; B29K 2063/00; B29K 2105/0872; B29K 2307/04; B29L 2031/748; B29L 2031/7724; B65H 2403/73; B65H 2403/731; F16C 7/026; Y10T 74/2152; Y10T 29/49288; Y10T 29/49801
See application file for complete search history.

(56) References Cited

U.S. PATENT DOCUMENTS 4,089,727 A * 5/1978 McLain ................ B29C 53/665
156/169
4,283,446 A * 8/1981 McLain ................ B29C 53/665
428/105
(Continued)

FOREIGN PATENT DOCUMENTS

BE   1016715 A3   5/2007
EP   0626250 A1   11/1994
(Continued)

*Primary Examiner* — Jason L Vaughan
(74) *Attorney, Agent, or Firm* — Reinhart Boerner Van Deuren P.C.

(57) ABSTRACT

The present invention relates to a method of manufacturing a connecting rod (1) by filament winding, said method comprising in particular: creating an internal body (5) by manufacturing a first component (6) by winding pre-impregnated fibers (17) around a mandrel (8) and removing the mandrel; manufacturing a second part (7); providing a shoulder (12) in the second part (7); assembling the first component with the second component (7, 22); creating an external body (14) by winding pre-impregnated fibers (17), identical to those used in the manufacture of the first component (6), around said internal body (5); creating a one-piece body (18) by polymerizing the assembly formed of the internal body and of the external body; and machining a fastening (19) at one end of the one-piece body; wherein the one-piece body (18) and the first fastening element (19) are made up of a one and same composite material.

15 Claims, 6 Drawing Sheets

(51) Int. Cl.
 *B29C 70/86* (2006.01)
 *B29K 63/00* (2006.01)
 *B29K 307/04* (2006.01)
 *B29K 105/08* (2006.01)
 *B29L 31/00* (2006.01)

(52) U.S. Cl.
 CPC .... *B29K 2105/0872* (2013.01); *B29K 2307/04* (2013.01); *B29L 2031/748* (2013.01); *Y10T 74/2152* (2015.01)

(56) References Cited

U.S. PATENT DOCUMENTS

| | | | |
|---|---|---|---|
| 4,704,918 A | 11/1987 | Orkin et al. | |
| 5,428,896 A | 7/1995 | Auberon et al. | |
| 2003/0125117 A1* | 7/2003 | Burkett | F16C 3/026 464/181 |
| 2008/0129041 A1* | 6/2008 | Allen | B29C 66/1142 285/55 |
| 2011/0277919 A1* | 11/2011 | Valembois | B29C 70/72 156/172 |
| 2012/0125146 A1* | 5/2012 | Boveroux | B29C 66/721 74/579 R |
| 2014/0225297 A1* | 8/2014 | Richard | B29B 11/16 264/152 |

FOREIGN PATENT DOCUMENTS

| | | |
|---|---|---|
| FR | 2645070 A3 | 10/1990 |
| FR | 2705610 | 12/1994 |
| GB | 2008484 A | 6/1979 |
| JP | S59-50216 | 3/1984 |
| WO | WO 2008/066606 A1 | 6/2008 |
| WO | WO 2010/084286 A1 | 7/2010 |
| WO | WO 2010/149768 A2 | 12/2010 |

* cited by examiner

ONE-PIECE CONNECTING ROD AND PRODUCTION METHOD THEREOF

SUBJECT OF THE INVENTION

The present invention relates to a method for manufacturing composite connecting rods. It relates more particularly, but not exclusively, to a method for manufacturing connecting rods usable in the aeronautics and aerospace field. The invention also relates to connecting rods as such.

STATE OF THE ART

It is known that a connecting rod is either a stiffening component, or a movement transmitting component. The forces that will be transmitted by the connecting rod are primarily traction, compression and flexion forces based on the resisting torque at the end of the connecting rod.

Figure 1:
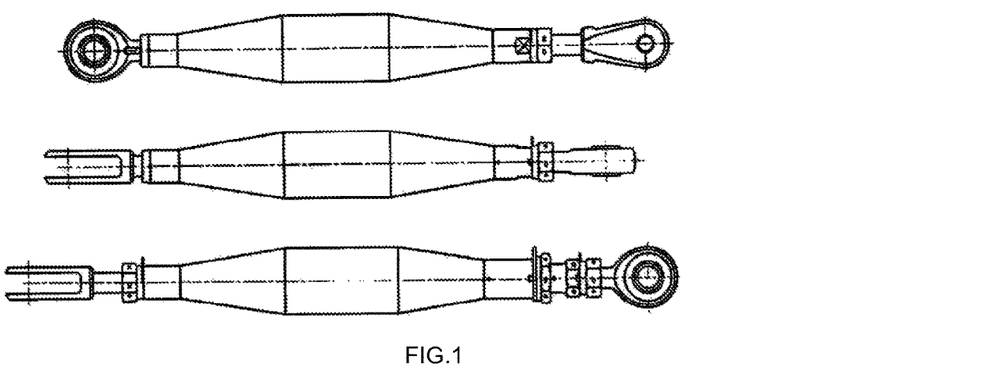
FIG. 1, already mentioned, shows a general diagram of metallic connecting rods according to the state of the art with different fastening means of the connecting rod.

In the aeronautics field, a large number of connecting rods are used. Connecting rods may be used in flight control elements, the landing gear, for door opening, etc. As an illustrative example, FIG. 1 shows a general diagram of connecting rods with different fastening means at the ends; these means ensure the fastening of the connecting rod to the elements to which it must transmit a movement or from which it must receive a movement or provide fastening.

The connecting rod is a component which must meet several criteria. It must be able to withstand significant thermal variations, as the connecting rod is subject to temperatures oscillating between −55 and 120° C. It must also have a mechanical strength/weight ratio that is as high as possible.

In their most common design, the connecting rods are made from aluminum or stainless steel, but connecting rods made from composite material also exist on the market.

Figure 2:
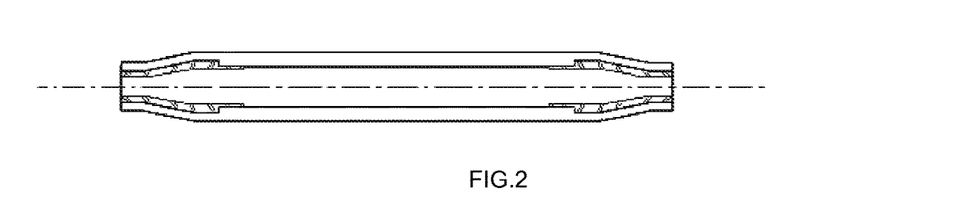
FIG. 2, already mentioned, shows a longitudinal section of a composite connecting rod according to the state of the art (without the fastening means).

Document WO 2010/149768 A2 describes a method for manufacturing a composite connecting rod by filament winding. According to that method, an inner body is made by winding preimpregnated fibers around a removable mandrel. End pieces designed to receive the fastening means are then positioned at the ends of the inner body. An outer body is then made by filament winding around the inner body and the end pieces. Lastly, the two bodies are polymerized to form a body in a single piece without any discontinuity and porosity at the interface thanks to the use of a same preimpregnated fiber to make the inner body and the outer body. A connecting rod obtained according to the method of application WO 2010/149768 A2 is shown in FIG. 2, where one can see the connecting rod body in a single piece gripping the end pieces at its ends, the end pieces being threaded to allow the subsequent screwing of the fastening means.

The material homogeneity within the connecting rod body according to document WO 2010/149768 A2 makes it possible to make a body free of any differential expansion problems during thermal variations. This method nevertheless has the drawback that the end pieces are positioned during the manufacture and are therefore not an integral part of the connecting rod body. As a result, differential expansion problems may appear with use between the connecting rod body and the end pieces. They will result in the appearance of cracks and detachments at the interface. Furthermore, in the case the end pieces and the connecting rod body are made from a composite material with different resins, contamination and aging problems may also appear.

Document EP 0 626 250 A1 describes a method for manufacturing a one-piece connecting rod made from a composite incorporating the fastening means. The method comprises steps for placing preimpregnated fibers by filament winding and by drape forming. This method has several drawbacks. First, it requires a fusible mandrel, and thus the making of a new mandrel for each connecting rod. Furthermore, due to the poor mechanical strength of the fusible mandrel, it is not possible to make connecting rods with a low diameter/length ratio and with forks having a small center distance. Then, it requires adhesive films and glass fabrics between certain layers of fibers, which makes the structure then not homogenous. Lastly, it also has the drawback that it requires compacting and autoclave polymerization steps.

Likewise, document WO 2010/084286 A1 discloses a manufacturing method by filament winding for a composite part requiring a fusible core.

Also known from document WO 2008/066606 A1 is a method for manufacturing a connecting rod by drape forming. The drape forming method has the drawback that it does not allow a placement of the fiber as precise as in the case of filament winding. Thus, at the ends of reduced section of the connecting rod, it is necessary to make cuts to be able to position the folds as close as possible to the part to be covered. Likewise, during compacting of the folds, a shift of the fiber may be observed. This poor positioning of the fiber will have a negative impact on the distribution of the forces in use between the resin and the fiber. Since drape forming is also a primarily manual operation, it cannot be guaranteed that the placement of the fibers, and therefore the mechanical properties, will be completely identical from one connecting rod to the next; this lack of repeatability of the mechanical properties is extremely detrimental in the aeronautics field.

AIMS OF THE INVENTION

The present invention aims to make one-piece connecting rods where the fastening means are incorporated into the connecting rod body.

It thus aims to make connecting rods having a completely homogenous structure, lacking any porosity or discontinuity and meeting the mechanical and thermal strength criteria.

It also aims to make a connecting rod from a method not requiring a fusible core, by filament winding.

MAIN FEATURES OF THE INVENTION

The present invention relates to a method for manufacturing a connecting rod comprising the following steps:
  providing a mandrel;
  making an inner body by:
    manufacturing a first part by winding preimpregnated fibers around said mandrel;
    removing the mandrel;
    assembling the first part with a second part;
  making an outer body by winding preimpregnated fibers around said inner body, said preimpregnated fibers being identical to those used during the manufacture of the first part;
  making a one-piece body by polymerization of the assembly formed by the inner body and the outer body;
  machining a fastening element at one end of the one-piece body.

According to specific embodiments of the invention, the method comprises at least one or a suitable combination of the following features:
  the second part is also made by winding preimpregnated fibers around said mandrel, said preimpregnated fibers being identical to those used during the manufacture of the first part and the outer body;

it comprises a step for making a shoulder in the second part, said shoulder serving for bearing during the assembly with the first part;

a tube is inserted into the second part to form the shoulder, said tube being manufactured via the filament winding method using preimpregnated fibers identical to those used for the inner body and the outer body;

the tube is coated with a layer of resin before insertion into the second part, said resin being identical to that of the preimpregnated fibers used during the making of the inner and outer bodies;

at least the first part is partially polymerized before assembly;

additional layers of preimpregnated fibers are wound on one end or both ends of the inner body during the making of the outer body;

it comprises a step for machining a fastening element at the other end of the one-piece body;

the second part is an end piece provided with a shoulder serving for bearing during the assembly with the first part;

the filament winding angle is variable along the inner body during the making of the outer body;

the mandrel comprises a cylindrical portion connected to a part with a rectangular section by a connecting part.

The present invention also relates to a connecting rod comprising a connecting rod body connecting two connecting rod heads, one of the connecting rod heads being a fastening element, characterized in that the connecting rod body and the fastening element form a one-piece assembly made in a one and same composite material.

According to specific embodiments of the invention, the connecting rod comprises at least one or a suitable combination of the following features:

the other connecting rod head is also a fastening element, the connecting rod body and the two connecting rod heads forming said one-piece assembly made in the one and same composite material;

the other connecting rod head comprises an end piece;

the end piece is made from metal, carbon or plastic material;

it does not have any discontinuities and porosities through the entire cross-section and the entire longitudinal section of the single-piece assembly.

LEGEND (1) Connecting rod
(2) Cylindrical portion of the connecting rod
(3) Connecting rod head
(4) Substantially conical portion
(5) Inner body
(6) First part
(7) Second part
(8) Mandrel
(9) Cylindrical portion of the mandrel
(10) Connecting part of the mandrel
(11) Rectangular section part of the mandrel
(12) Shoulder
(13) Tube
(14) Outer body
(15) Bearing journal
(16) Jaws
(17) Preimpregnated fiber
(18) One-piece body
(19) Fastening element
(20) Flat section
(21) Additional layer
(22) End piece

DETAILED DESCRIPTION OF THE INVENTION

Figure 3:
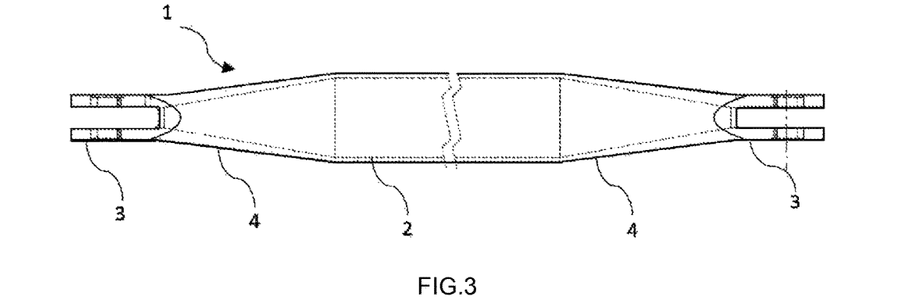
FIG. 3 shows a front view of the composite connecting rod according to the invention.

The present invention relates to a composite connecting rod. The composite connecting rod 1 according to the invention comprises a hollow cylindrical portion 2 connecting two connecting rod heads 3 as shown in FIG. 3. The two connecting rod heads 3 are connected to the cylindrical portion 2 by a substantially conical portion 4 with an increasing section and a thinning wall thickness from the head 3 toward the cylindrical portion 2, the substantially conical portions 4 and the cylindrical portion 2 forming the connecting rod body.

According to the invention, one or both of the connecting rod heads are made in a same material as the connecting rod body and are in the form of a fastening element, for example of the fork type. The assembly of the cylindrical portion 2, the conical portions 4 and the connecting rod heads 3 then forms a one-piece connecting rod 1. "One-piece" means that the entire connecting rod is made in a one and same composite material without adding other materials such as glue, adhesive or glass fabric. This means that the structure is homogenous (without any discontinuity) over the entire vertical or longitudinal section of the connecting rod irrespective of the location where the cut is made. The homogenous structure has thus no joint plane, junction defect or interface defect. By extension, the phrase "one-piece connecting rod" will also refer to a connecting rod where only a connecting rod head is an integral part of the connecting rod and is thus made in a same material as the connecting rod body, the other head comprising an end piece positioned as described in application WO 2010/149768 A2. In that case, the fastening element may be an integral part of the attached end piece or the latter may be threaded to subsequently receive a fastening element. This alternative of the method will also be described in the present description.

The method according to the invention is first illustrated below for the manufacture of a one-piece connecting rod comprising two connecting rod heads made in a same material as the connecting rod body.

Figure 4:
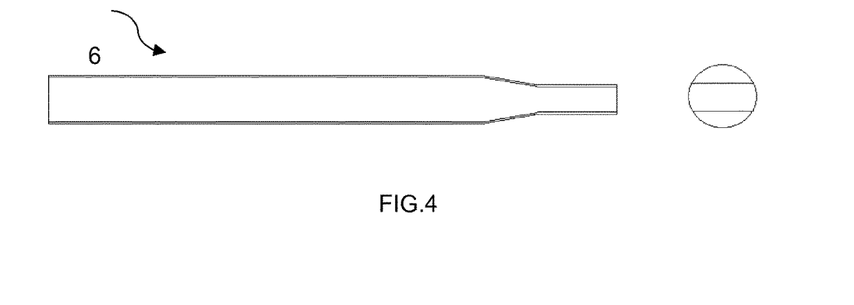
FIG. 4 shows a longitudinal section of one of the component parts of the inner body of the connecting rod according to the invention and an end view of that part.

A first step a) consists of making an inner body, also called lost mandrel, which, as its name indicates, will be lost in the end product. The inner body is made by assembling two parts 6, 7, which in turn are made as follows. A first part 6 is made as shown in FIG. 4, using the traditional filament winding method, which consists in winding a preimpregnated fiber on a mandrel (winding not shown in the figures), consolidating it by partial polymerization and then removing the mandrel. The mandrel 8, shown in FIGS. 5a and 5b, has a cylindrical portion 9 with a shape substantially corresponding to that of the connecting rod, extended by a connecting part 10 corresponding to the substantially conical portion 4 of the connecting rod and ending with a part 11 with a rectangular section designed to make the connecting rod head in the form of a fastening element. The connecting part 10 has, on its upper and lower faces, a flat section 20 extending in three successive planes (see FIG. 5a).

Figure 5:
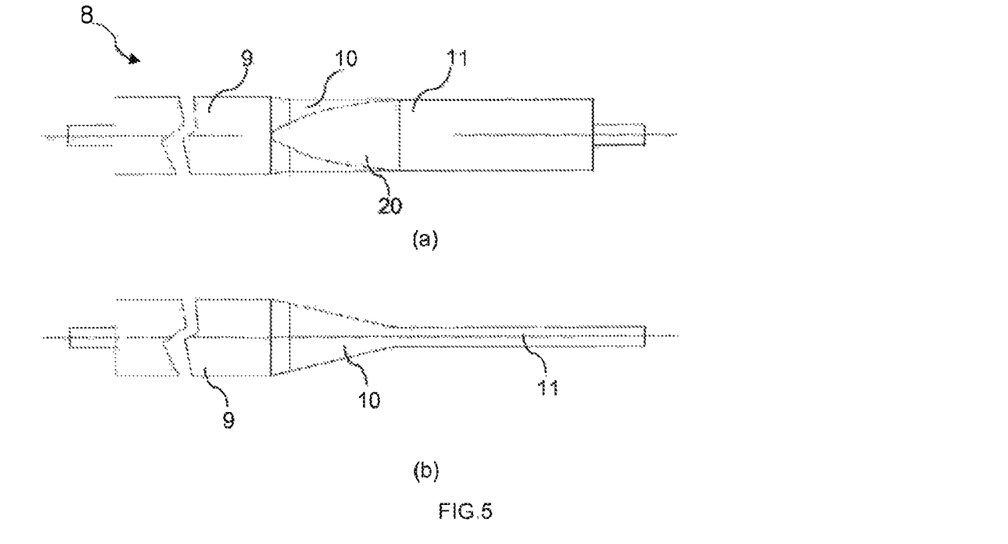
FIGS. 5a and 5b respectively show a top view and a front view of a mandrel used to make the inner body of the connecting rod according to the invention.
Figure 18:
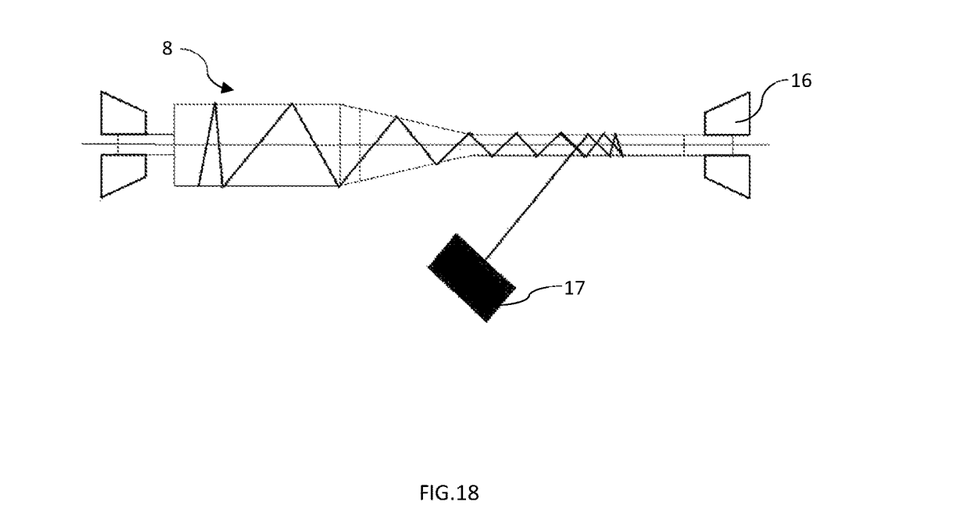
FIG. 18 illustrates manufacturing the second part (7) by winding fibers around the same mandrel (8) used to manufacture the first part (6).

A second part 7 is also made by filament winding around the mandrel 8 and partially polymerized, the mandrel being removed after the partial polymerization. It will be specified that the two parts 6 and 7 may have a cylindrical portion with a variable length as needed. For example, the first part may comprise a cylindrical portion with a length greater than that of the second part.

Figure 6:
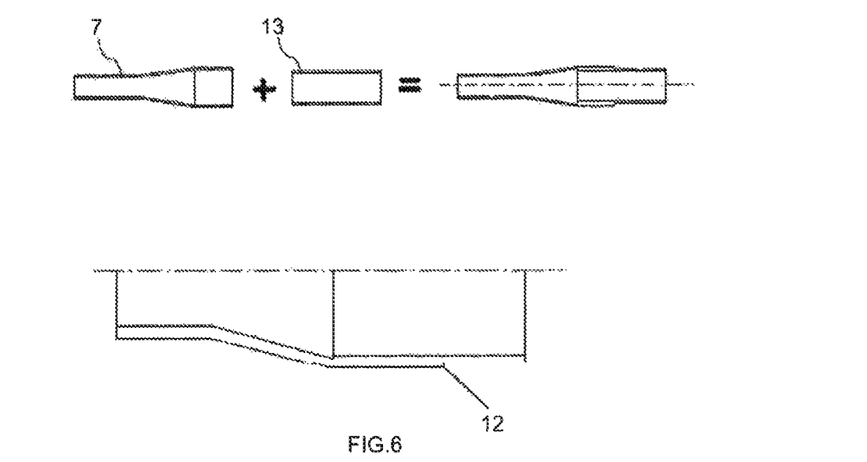
FIG. 6 illustrates the assembly of one of the component parts of the inner body of the connecting rod according to the invention with a tube to form a shoulder, as well as a half-view of the assembly.

A shoulder 12 is then arranged at the cylindrical portion of the second part 7. The shoulder 12 is formed by adding a tube 13 inside the cylindrical portion until it rests against the conical portion as shown in FIG. 6, the tube having of course an outer diameter slightly smaller than the inner diameter of the cylindrical portion. According to the invention, the tube has been made beforehand using the filament winding method and partially polymerized. In order to make a one-piece body according to the invention, the preimpregnated fiber used for manufacturing the tube is the same as that used for the parts 6 and 7. Furthermore, the tube is preferably coated with a layer of resin identical to that of the preimpregnated fibers before insertion into the second part and assembly with the first part. The purpose of this coating is to avoid the formation of porosity between the parts 6 and 7 and the tube 13, thus making it possible to obtain a one-piece connecting rod according to the invention.

Alternatively, the shoulder 12 can be machined into the second part 7 rather than formed via the insertion of a tube.

Figure 7:
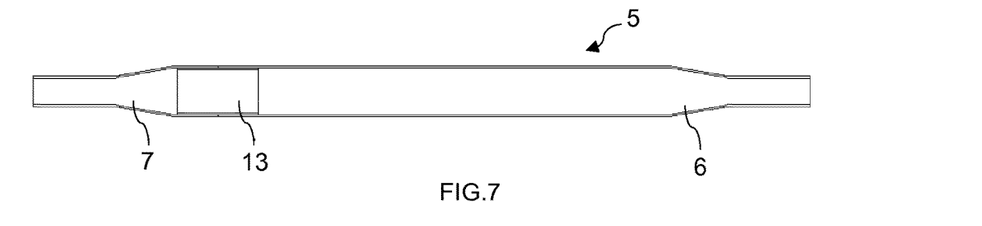
FIG. 7 shows a longitudinal section of the various component parts of the inner body of the connecting rod according to the invention after assembly.

The two parts 6, 7 are then assembled, the first part 6 resting on the shoulder 12 of the second part 7 (see FIG. 7).

Figure 8:
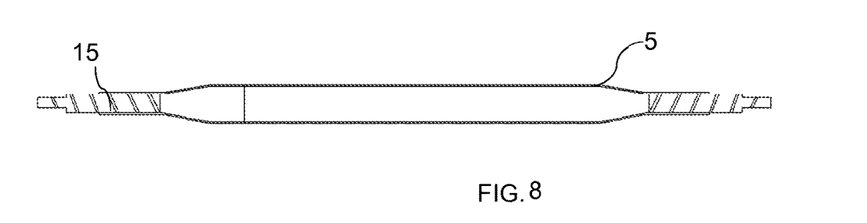
FIG. 8 illustrates the placement of bearing journals at the ends of the inner body of the connecting rod according to the invention.
Figure 9:
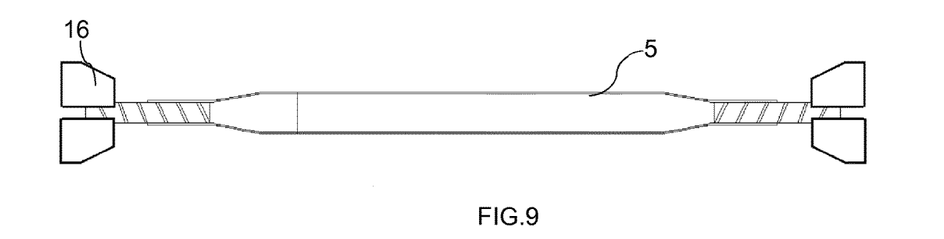
FIG. 9 illustrates the placement of jaws on the bearing journals of FIG. 8.
Figure 10:
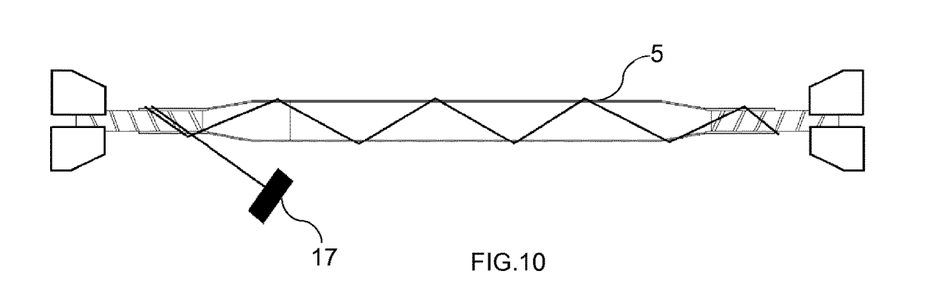
FIG. 10 illustrates the filament winding step around the inner body.
Figure 11:
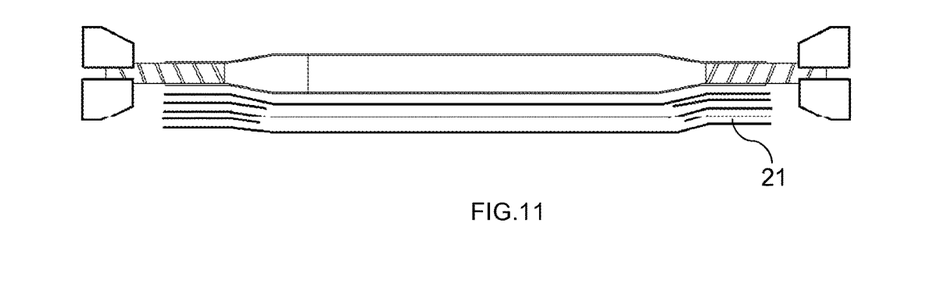
FIG. 11 diagrammatically shows the stack of layers of wires around the inner body with additional layers at the end of the inner body.
Figure 12:
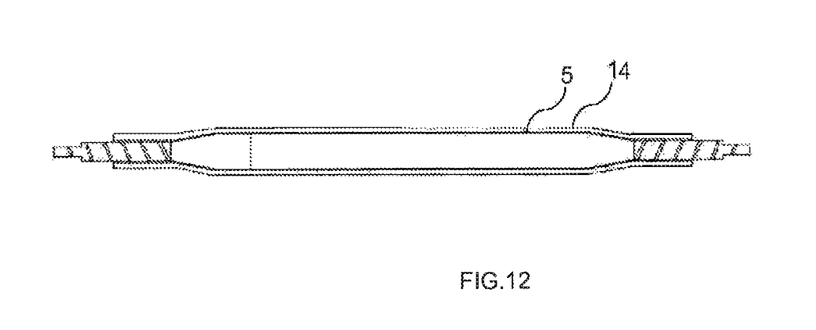
FIG. 12 shows a longitudinal section of the inner body and the outer body of the connecting rod according to the invention before post-curing.

A second step b) consists in making an outer body 14 around the inner body 5 as shown in FIG. 12. To that end, after placing the bearing journals 15 and jaws 16 at the ends of the inner body for the assembly of the latter on the filament winding machine, the preimpregnated fiber 17 is wound on the entire inner body 5 (see FIGS. 8 to 10). According to the invention, the preimpregnated fiber used to manufacture the inner body and the outer body is the same (same fiber, same resin) so as to ultimately make a product without any discontinuity between the two bodies. In order to obtain the desired thicknesses at the connecting rod heads, additional layers 21 can be placed at the ends of the inner body 5 as shown in FIG. 11. The additional layers 21 can be placed at the connecting rod heads with a rectangular section and partially at the connecting part. By adding successive layers of fibers along the inner body, the finished outer shape of the connecting rod body as shown in FIG. 12 is obtained. In order to reinforce the mechanical properties of the obtained connecting rod, the winding angle can be modified at the ends.

Figure 13:
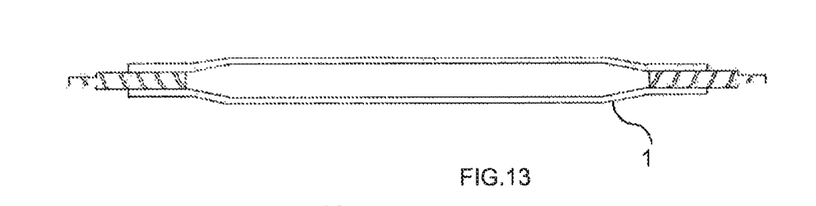
FIGS. 13 and 14 show a longitudinal section of the single-piece body of the connecting rod according to the invention after post-curing (before and after removal of the trunnions, respectively).
Figure 14:
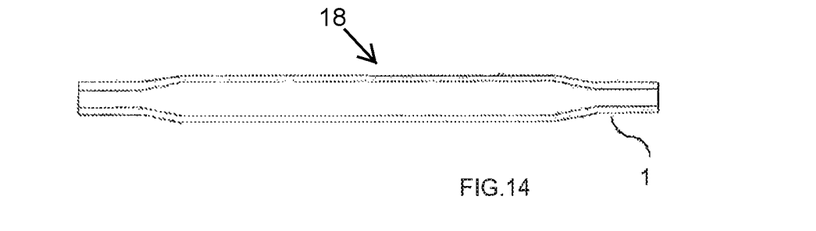

In a third step c), the outer body 14 and the inner body 5 are polymerized in order to obtain a one-piece body 18 where the inner and outer bodies form only one body, without any discontinuity or porosity at the interface between the two bodies (see FIGS. 13 and 14). Thus, in cross-section, it is no longer possible to differentiate the inner body from the outer body.

Figure 15:
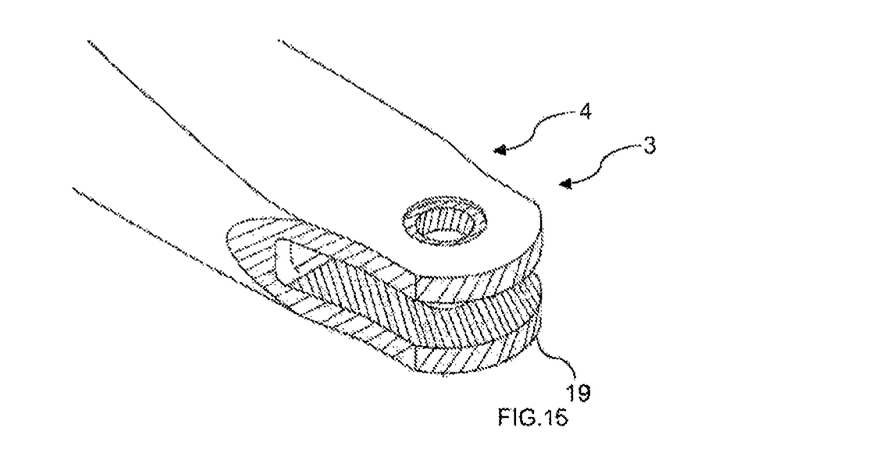
FIG. 15 shows a three-dimensional view of one end of the connecting rod according to the invention after machining of the fastening element.

In a fourth step d), the fastening element 19 is machined into each connecting rod head 3 and partially in the conical portion 4 (see FIG. 15). All of the crosshatched areas delimit the parts machined to ultimately form a one-piece connecting rod as previously illustrated in FIG. 3, with a fork at each end. Alternatively, only the outer areas with crosshatched areas spaced further apart may be machined, in which case another type of fastening element is made.

The method for manufacturing the connecting rod as described above must be adapted when only one connecting rod head is machined to form a fastening element, the other head comprising a positioned end piece. According to this alternative, in the first step a), an end piece 22 provided with a shoulder 12 is positioned at the end with a circular section of the component part 6 (see FIG. 17). The end piece may be metallic, made from high resistance plastic material, carbon or any other material suitable for the targeted application. As already mentioned, the end piece may be threaded to later receive a fastening element or it may directly comprise a fastening element.

Figure 17:
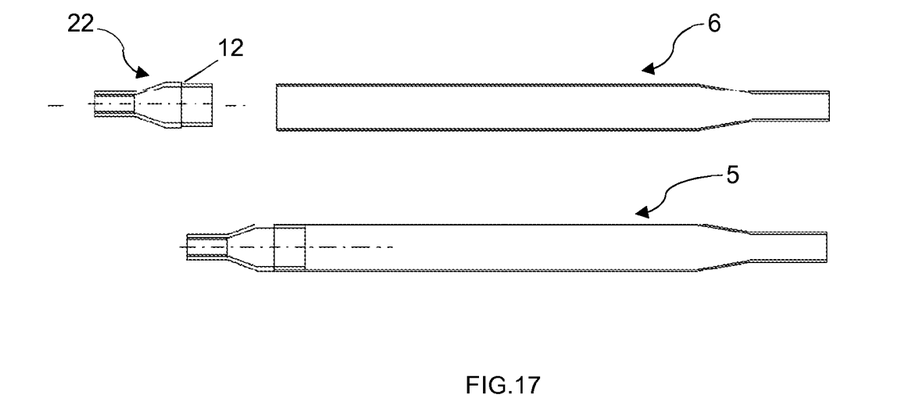
FIG. 17 shows, in two longitudinal sectional views, the assembly step, according to one alternative of the invention, of an end piece with one end of the part according to FIG. 4.

The assembly of the part 6 with the end piece 22 forms the inner body 5 around which, in step b), the preimpregnated fiber is wound to form the outer body similarly to the method previously described. Step c) is also equivalent. In the fourth step d), the fastening element is machined as before into the only connecting rod head with a rectangular section.

It will be specified that, in both alternatives of the method, the shapes of the mandrel, the connecting rod body and the connecting rod heads are provided as an illustration. The so-called "cylindrical" part of the connecting rod may have a section other than circular, such as oval, square, etc., the shape of the mandrel being modified consequently. The same is true for the so-called "substantially conical" part and the connecting rod heads with a rectangular section before machining of the fastening elements. Likewise, the connecting rod heads have been shown, after machining, in the form of a fork, but depending on the needs, they may assume other forms.

According to the invention, the fibers are preferably carbon fibers and the resin must be chosen to ensure a sufficient rigidity for all of the component parts of the connecting rod before the post-curing step c). For example, it may be an epoxy resin.

Advantages of the Method According to the Invention

According to the present invention, the entire connecting rod, including the fastening element(s) are made with a same preimpregnated fiber. Using a same resin and a same fiber makes it possible to make a one-piece body, during post-curing in step c), which will be free of any differential thermal expansion problems.

The manufacture of connecting rods incorporating the fastening elements makes it possible to reduce costs, since it is no longer necessary to position the latter during an additional step.

Making a connecting rod entirely in composite material makes it possible to lighten the weight compared to a connecting rod with attached metallic end pieces.

Figure 16:
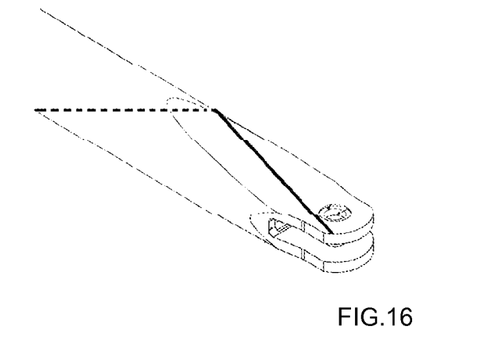
FIG. 16 shows a three-dimensional view of the continuity of the fiber between the connecting rod body and the connecting rod head.

As shown in FIG. 16, the fiber is continuous between the connecting rod body and the fork. This makes it possible to improve the fatigue behavior, since when the forks are mechanically stressed, the fiber of the connecting rod body takes over the force.

The method according to the invention is flexible. It makes it possible to produce a connecting rod comprising at one end a fastening element and at the other end a threaded end piece into which the fastening element is subsequently screwed. This type of connecting rod has the advantage of having a variable length (thanks to the screwing) depending on the needs and the space available within the airplane.

The method according to the invention also has the advantage of making it possible to make a complex part using traditional filament winding methods, which generates low manufacturing costs. The gain lies in the implementation of the methods and the design of the connecting rod itself.

The method according to the invention does not require any fusible core. This makes it possible to:
reduce the manufacturing costs;
manufacture connecting rods with a low diameter/length ratio without collapse and flexion of the mandrel;
manufacture connecting rods with a small center distance at the forks, which may be as low as 3 mm;
obtain a better surface finish inside the connecting rod and, consequently, a better reception of the signal during ultrasound examination.

The invention claimed is:

1. A method for manufacturing a connecting rod (1) by filament winding, said method comprising the following steps:
providing a mandrel (8);
making an inner body (5) by:
manufacturing a first part (6) by winding preimpregnated fibers (17) around said mandrel (8);
removing the mandrel (8);
manufacturing a second part (7);
providing a shoulder (12) in the second part (7);
assembling the first part (6) with the second part (7, 22);
making an outer body (14) by winding preimpregnated fibers (17) around said inner body (5), said preimpregnated fibers (17) being identical to those used during the manufacture of the first part (6);
making a one-piece body (18) by polymerization of the assembly formed by the inner body (5) and the outer body (14);
machining a first fastening element (19) at one end of the one-piece body (18);
wherein the one-piece body (18) and the first fastening element (19) are made up of a one and same composite material.

2. The method according to claim 1, wherein the second part (7) is also made by winding preimpregnated fibers (17) around said mandrel (8), said preimpregnated fibers (17) being identical to those used during the manufacture of the first part (6) and the outer body (14).

3. The method according to claim 1, wherein the shoulder (12) serves as a bearing surface that abuts the first part (6) during the assembly of the first part (6) with second part (7).

4. The method according to claim 1, wherein at least the first part (6) is partially polymerized before assembly.

5. The method according to claim 1, wherein additional layers (21) of preimpregnated fibers (17) are wound on one end or both ends of the inner body (5) during the making of the outer body (14).

6. The method according to claim 1, comprising a step of machining a second fastening element (19) at the other end of the one-piece body (18).

7. The method according to claim 1, wherein the second part is an end piece (22), the shoulder (12) of the end piece (22) serving as a bearing surface that abuts the first part (6) during the assembly of the first part (6) with the end piece (22).

8. The method according to claim 1, wherein the filament winding angle is variable along the inner body (5) during the making of the outer body (14).

9. The method according to claim 1, wherein the mandrel (8) comprises a cylindrical portion (9) connected to a part with a rectangular section (11) by a connecting part (10).

10. The method of claim 6, wherein the one-piece body (18) and the first and second fastening elements (19) are made up of a one and same composite material.

11. The method of claim 1, including the step of providing a second fastening element (19) at the other end of the one-piece body (18), wherein the second fastening element (19) is made from metal, carbon or plastic material.

12. The method according to claim 1, wherein the step of manufacturing the first part (6) includes providing the first part (6) with a first part cylindrical portion having a first length;
the step of manufacturing the second part (7) includes providing the second part (7) with a second part cylindrical portion having a second length; and
wherein the first length is greater than the second length.

13. The method according to claim 1, wherein the step of manufacturing the first part (6) includes providing the first part (6) with a first part cylindrical portion having a first length;
the step of manufacturing the second part (7) includes providing the second part (7) with a second part cylindrical portion having a second length; and
wherein the second length is greater than the first length.

14. A method for manufacturing a connecting rod (1) by filament winding, said method comprising the following steps:
- providing a mandrel (8);
- making an inner body (5) by;
- manufacturing a first part (6) by winding preimpregnated fibers (17) around said mandrel (8);
- removing the mandrel (8);
- manufacturing a second part (7),
- providing a shoulder (12) in the second part (7);
- assembling the first part (6) with the second part (7, 22);
- making an outer body (14) by winding preimpregnated fibers (17) around said inner body (5), said preimpregnated fibers (17) being identical to those used during the manufacture of the first part (6);
- making a one-piece body (18) by polymerization of the assembly formed by the inner body (5) and the outer body (14);
- machining a fastening element (19) at one end of the one-piece body (18);
- wherein the shoulder (12) serves as a bearing surface that abuts the first part (6) during the assembly of the first part (6) with second part (7); and
- wherein a tube (13) is inserted into the second part (7) to form the shoulder (12), said tube (13) being manufactured via the filament winding method using preimpregnated fibers (17) identical to those used for the inner body (5) and the outer body (14).

15. A method for manufacturing a connecting rod (1) by filament winding said method comprising the following steps:
- providing a mandrel (8);
- making an inner body (5) by;
- manufacturing a first part (6) by winding preimpregnated fibers (17) around said mandrel (8);
- removing the mandrel (8);
- manufacturing a second part (7);
- providing a shoulder (12) in the second part (7);
- assembling the first part (6) with the second part (7, 22);
- making an outer body (14) by winding preimpregnated fibers (17) around said inner body (5), said preimpregnated fibers (17) being identical to those used during the manufacture of the first part (6);
- making a one-piece body (18) by polymerization of the assembly formed by the inner body (5) and the outer body (14);
- machining a fastening element (19) at one end of the one-piece body (18);
- wherein the shoulder (12) serves as a bearing surface that abuts the first part (6) during the assembly of the first part (6) with second part (7);
- wherein a tube (13) is inserted into the second part (7) to form the shoulder (12), said tube (13) being manufactured via the filament winding method using preimpregnated fibers (17) identical to those used for the inner body (5) and the outer body (14); and
- wherein the tube (13) is coated with a layer of resin before insertion into the second part (7), said resin being identical to that of the preimpregnated fibers used during the making of the inner (5) and outer (14) bodies.

* * * * *

UNITED STATES PATENT AND TRADEMARK OFFICE
CERTIFICATE OF CORRECTION

PATENT NO. : 9,568,041 B2  Page 1 of 1
APPLICATION NO. : 14/434491
DATED : February 14, 2017
INVENTOR(S) : Benoît Boveroux et al.

It is certified that error appears in the above-identified patent and that said Letters Patent is hereby corrected as shown below:

In the Claims

Column 9, Line 30, Claim 15, reads "winding" and should read --winding,--

Column 10, Line 2, Claim 15, reads "by;" and should read --by:--

Signed and Sealed this
Second Day of May, 2017

Michelle K. Lee
*Director of the United States Patent and Trademark Office*